United States Patent
Kanno et al.

(10) Patent No.: US 11,361,519 B1
(45) Date of Patent: Jun. 14, 2022

(54) INTERACTABLE AUGMENTED AND VIRTUAL REALITY EXPERIENCE

(71) Applicants: Niantic, Inc., San Francisco, CA (US); Niantic International Technology Limited, Bristol (GB)

(72) Inventors: Chihiro Kanno, Kawasaki (JP); Shigeru Miyamoto, Kyoto (JP)

(73) Assignee: Niantic, Inc., San Francisco, CA (US)

(*) Notice: Subject to any disclaimer, the term of this patent is extended or adjusted under 35 U.S.C. 154(b) by 0 days.

(21) Appl. No.: 17/216,413

(22) Filed: Mar. 29, 2021

(51) Int. Cl.
*G06T 7/50* (2017.01)
*G06T 19/00* (2011.01)
*G06F 3/04815* (2022.01)

(52) U.S. Cl.
CPC ........ *G06T 19/006* (2013.01); *G06F 3/04815* (2013.01); *G06T 7/50* (2017.01); *G06T 2207/10016* (2013.01)

(58) Field of Classification Search
CPC .............. G06T 19/006; G06T 7/50; G06T 2207/10016; G06F 3/04815
See application file for complete search history.

(56) References Cited

U.S. PATENT DOCUMENTS

| | | | |
|---|---|---|---|
| 9,418,479 B1* | 8/2016 | Worley, III | G01B 11/2513 |
| 2009/0315916 A1* | 12/2009 | Husemann | G06Q 30/06 |
| | | | 345/633 |
| 2010/0169795 A1* | 7/2010 | Hyndman | G06F 9/451 |
| | | | 715/757 |
| 2014/0240351 A1* | 8/2014 | Scavezze | G06F 3/0346 |
| | | | 345/633 |
| 2015/0109481 A1* | 4/2015 | Hayakawa | H04N 5/2224 |
| | | | 348/239 |
| 2017/0270711 A1* | 9/2017 | Schoenberg | A63F 13/213 |
| 2017/0354886 A1* | 12/2017 | Sato | A63F 13/56 |
| 2018/0122142 A1* | 5/2018 | Egeler | G06F 3/011 |
| 2020/0150750 A1* | 5/2020 | Suzuki | G06F 3/0484 |
| 2020/0311442 A1* | 10/2020 | Shibata | G06T 7/73 |

\* cited by examiner

Primary Examiner — Jitesh Patel
(74) Attorney, Agent, or Firm — Fenwick & West LLP

(57) ABSTRACT

A client device can display various augmented reality and virtual reality images to a user. For example, the client device captures images of an external environment and identifies objects in the environment. If an object satisfies a virtual environment criterion, the client device displays a window to a virtual environment at the location of the object in the environment. In another example, the client device includes a light assembly that can generate light. If the user turns the light assembly on, virtual objects displayed in the environment will gather to a region highlighted by the light from the light assembly. In another example, the client device estimates depth information of an object in the environment. The client device then displays a virtual object in the environment based on the depth information and may also display the virtual object interacting with an object in the external environment.

19 Claims, 14 Drawing Sheets

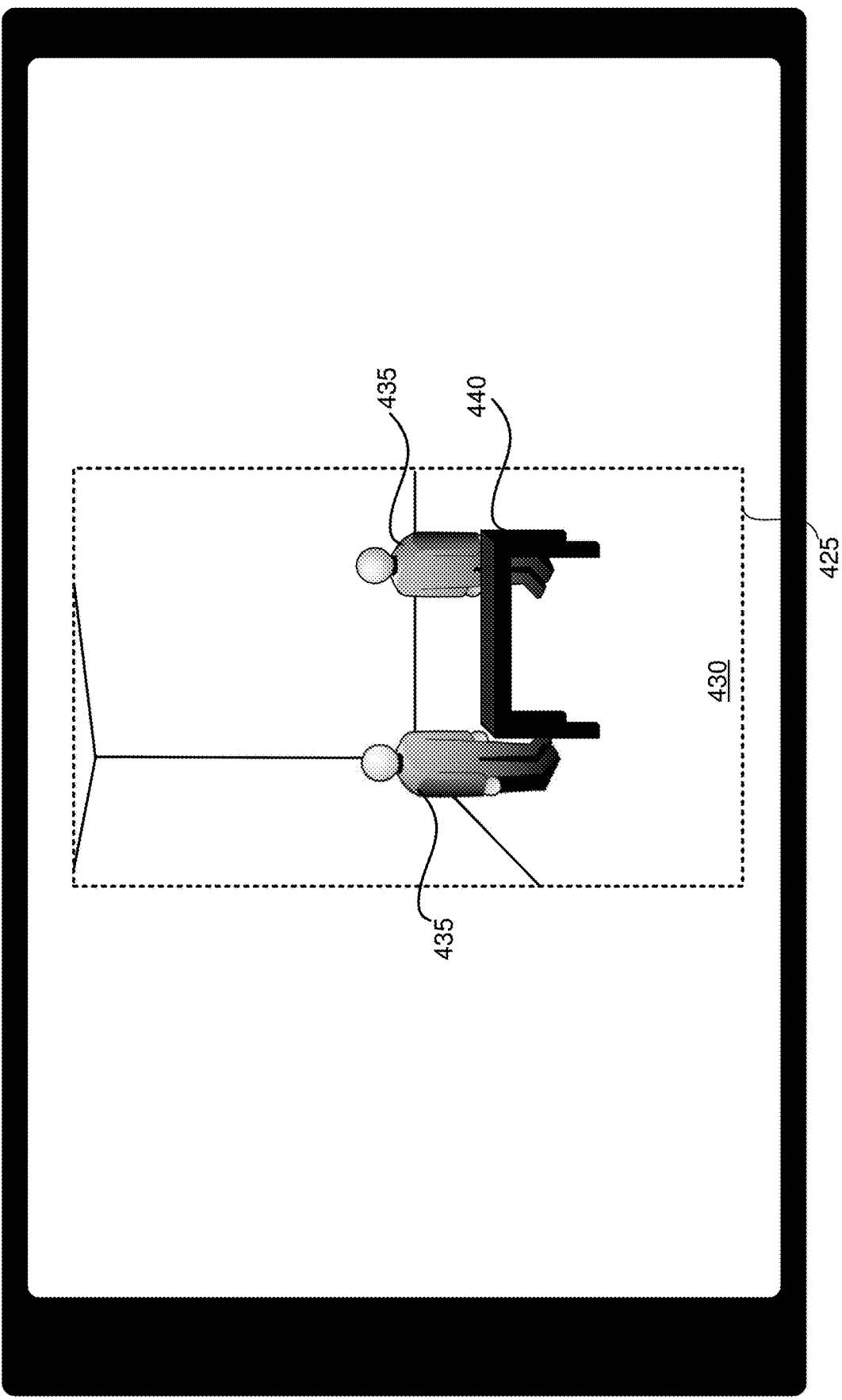

INTERACTABLE AUGMENTED AND VIRTUAL REALITY EXPERIENCE

BACKGROUND

1. Technical Field

The subject matter described generally relates to displaying interactable augmented reality (AR) and virtual reality (VR) images.

2. Problem

Display devices can be used to present information to a user through an immersive experience. This information may include traditional still images or videos but can also include augmented reality (AR) or virtual reality (VR) images. AR and VR are useful in a variety of fields including gaming, engineering, medicine, and aviation. However, AR and VR experiences are typically experienced in isolation from each other. Furthermore, a user's ability to interact with virtual objects (either AR or VR objects) is typically limited to a few gestures or control commands.

SUMMARY

A client device can display various interactable augmented reality (AR) and virtual reality (VR) images to a user.

In some embodiments, the client device captures images of an external environment and identifies real world objects in the external environment. If an object satisfies a virtual environment criterion, the client device displays a window to a virtual environment at or near the location of the object in the external environment. The client device then displays portions of the virtual environment through the window. Thus, the user can investigate the virtual environment by moving the client device relative to the object.

In some embodiments, the client device includes a light assembly that can generate light and the client device displays virtual characters in the external environment. If the user turns on the light assembly, the virtual characters will gather to a region of the external environment highlighted by the light from the light assembly. Thus, by turning on the light assembly and moving the client device, the user can control the movement of the virtual characters in the external environment.

In some embodiments, the client device estimates depth information of objects in the external environment. The client device may display a virtual object in the external environment based on the depth information. The client device may also display the virtual object interacting with the objects in the external environment. Thus, the virtual object may appear more realistic or lifelike to the user.

BRIEF DESCRIPTION OF THE DRAWINGS

FIGS. 4A-4D are a sequence of example images that illustrate the display of a window to a virtual environment, according to some embodiments.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality (AR) content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where AR and virtual reality VR images are displayed. Furthermore, those of ordinary skill in the art, using the disclosures provided herein, will appreciate that numerous game interface configurations and underlying functionalities will be apparent in light of this disclosure. The present disclosure is not intended to be limited to any one particular configuration.

In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
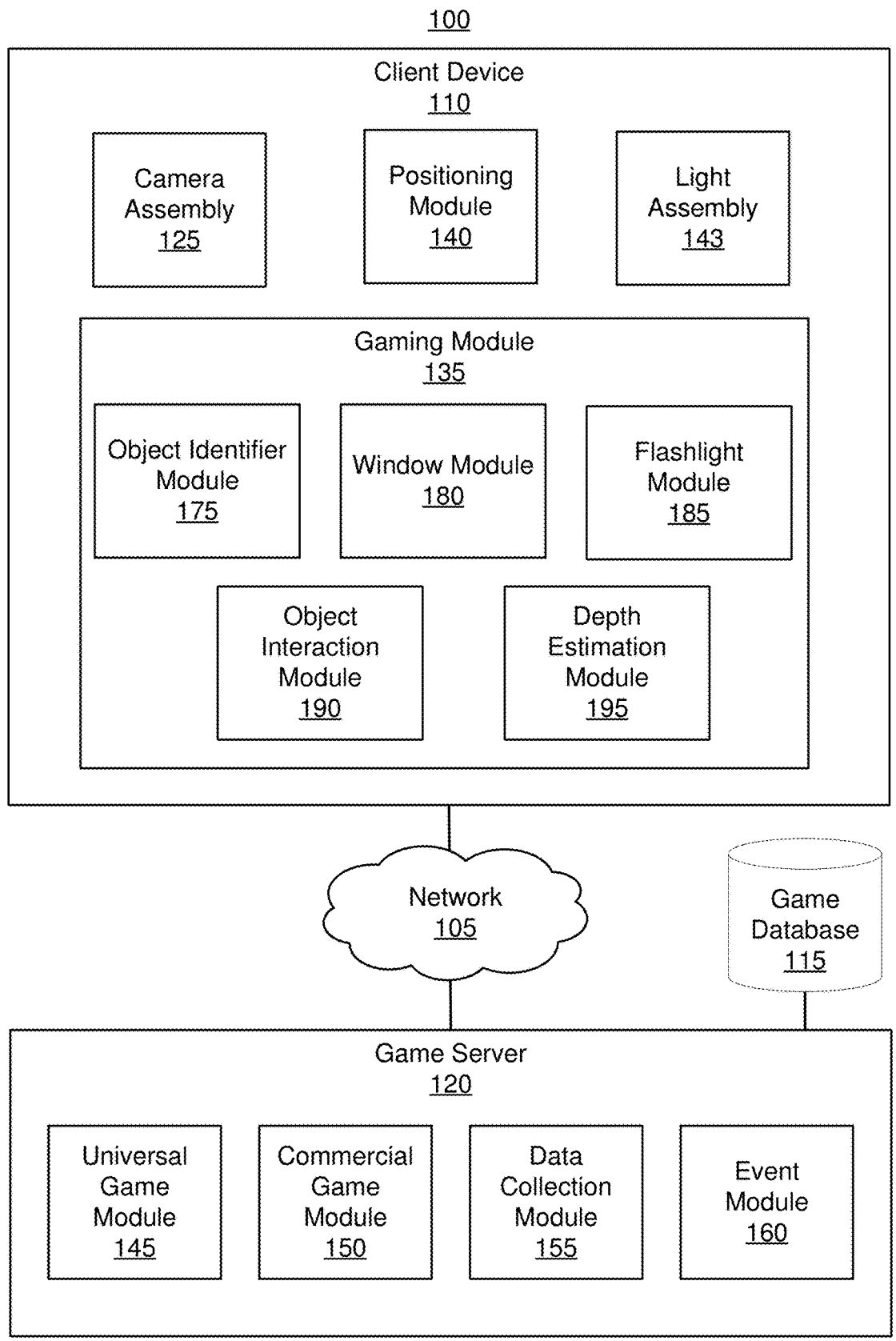
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, a player who is close enough to a virtual element to interact with it in this manner is referred to as being at the real-world location corresponding the virtual element. In addition, various embodiments are described with reference to "the player's location" but one of skill in the art will appreciate that such references may refer to the location of the player's client device 110.

Figure 2:
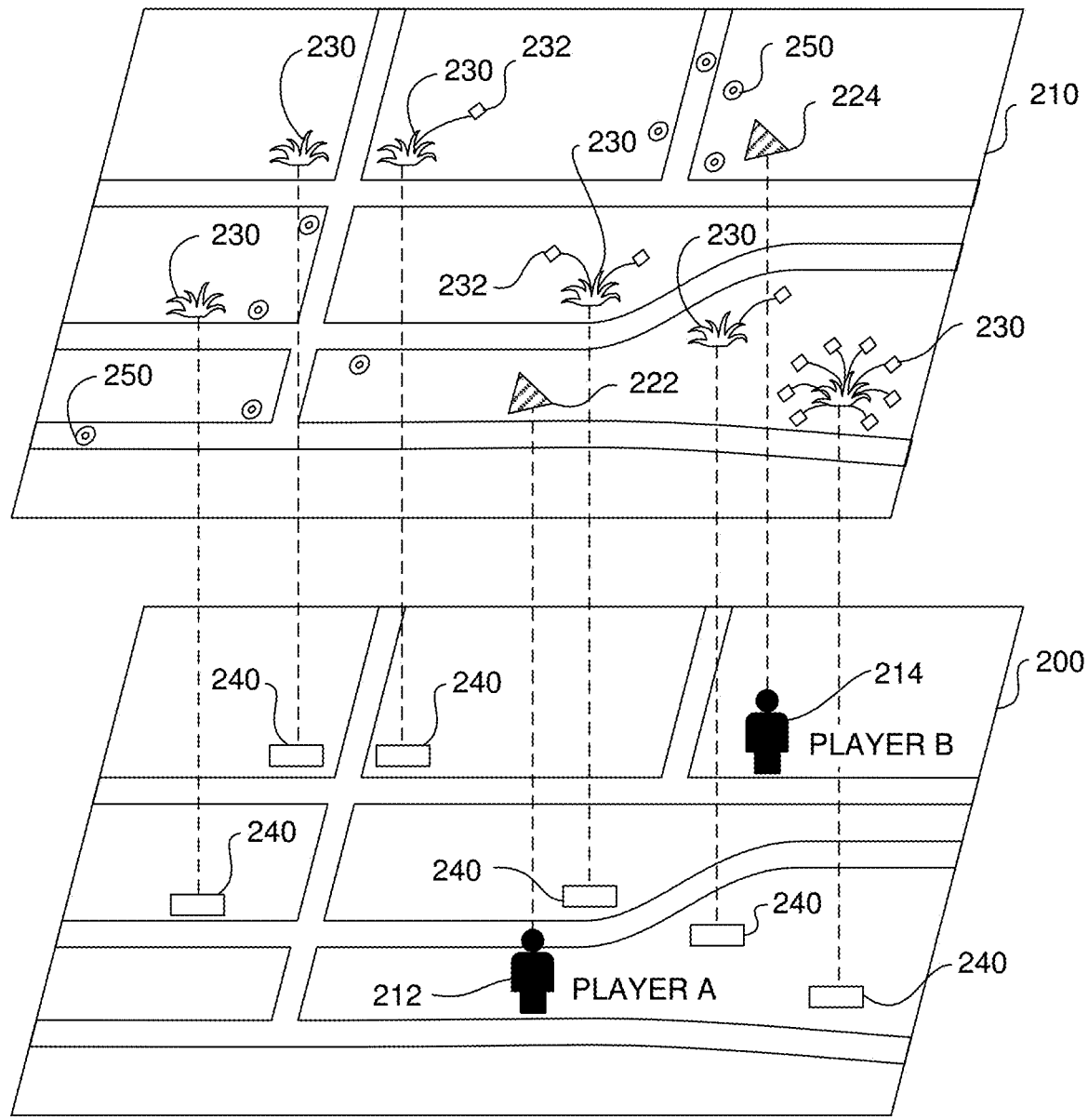
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. As described herein a virtual object can be an AR or VR object that is displayed by the client device 110. Virtual objects include animate and inanimate objects. Animate objects may be referred to as a virtual character. Virtual characters can represent a character of the game, such as a non-player character (NPC). A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player travels to the landmark or geographic location 240 linked to the virtual elements 230 in the real world and interacts with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph or verifying, obtaining, or capturing other information about the landmark or object 240 associated with the virtual element 230. In other embodiments, different or additional mechanisms for capturing virtual elements may be available. For example, an in-game item may enable a player to interact with a virtual element remotely (i.e., from a real-world location other than the location corresponding to the virtual element).

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes additional software components such as a gaming module 135, a positioning module 140, and a light assembly 143. The client device 110 may include various other input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 includes one camera and is configured to capture monocular image data. In another instance, the camera assembly 125 includes two cameras and is configured to capture stereo image data. In various other implementations, the camera assembly 125 includes multiple cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a player to interact in the virtual world to perform various game objectives. In some other embodiments, the gaming module 135 presents image data from the real world (e.g., captured by the camera assembly 125) augmented with virtual elements or objects from the parallel reality game. In these embodiments, the gaming module 135 may generate virtual content or adjust virtual content according to other information received from other components of the client device. For example, the gaming module 135 may adjust a virtual object to be displayed on the user interface according to a depth information of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the player. The gaming module 135 can receive and process player input and provide updates to the game server 120 over the network 105. The gaming module 135 may also generate or adjust game content to be displayed by the client device 110. For example, the gaming module 135 may generate a virtual element based on information describing traversable space of a scene (e.g., as determined by the traversable space estimation model 130). For example, the gaming module 135 may determine a path for a virtual element in the scene on the traversable space.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a traversable space estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users (e.g., players), or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
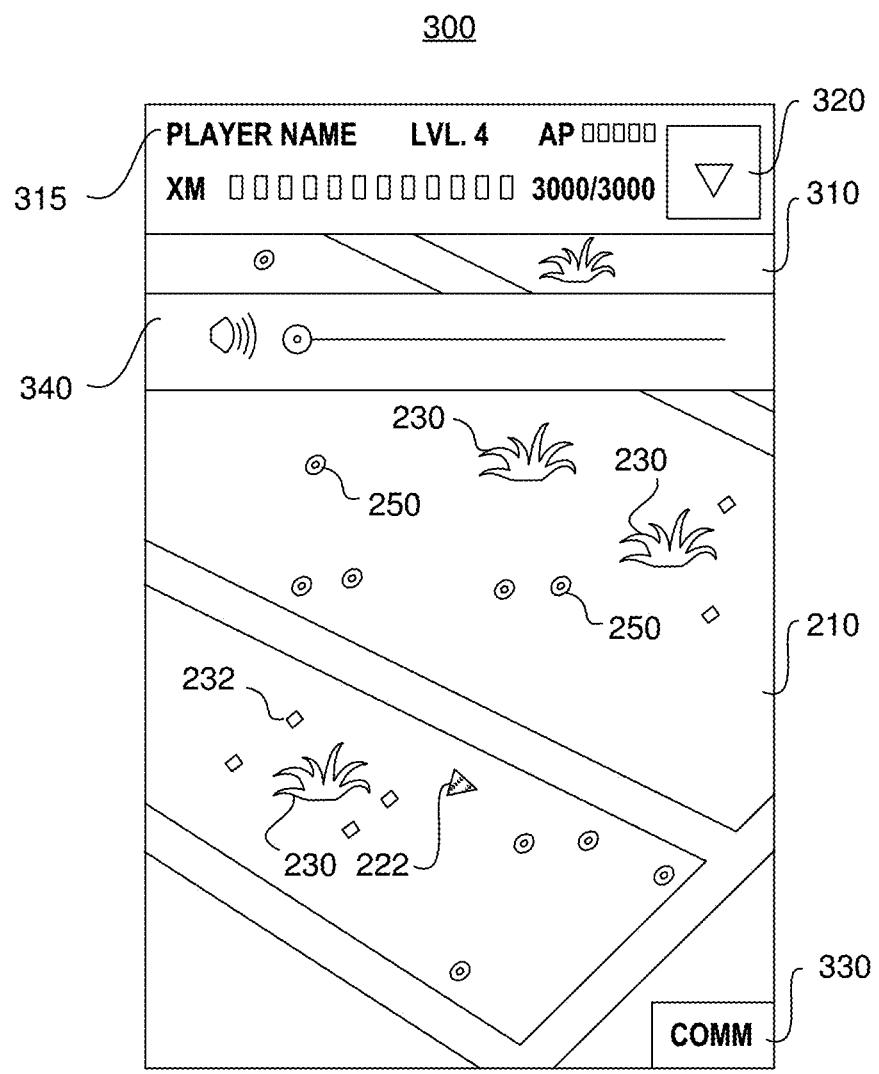
FIG. 3 depicts an exemplary game interface of a parallel reality game, in accordance with one or more embodiments.

FIG. 3 depicts one embodiment of a game interface 300 that can be presented on a display of a client 110 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Referring back to FIG. 1, in some embodiments, the gaming module 135 includes an object identifier module 175, a window module 180, a flashlight module 185, an object interaction module 190, and a depth estimation module 195. Although these modules are stored on the client device 110, one or more of these modules may be may stored on the game server 120. For example, images captured by the camera assembly 125 are sent to a module on the game server 120 and the module later provides display instructions to the client device 110 via the network 105. Additionally, although the modules are part of the gaming module 135, the modules are not limited to gaming contexts. Modules 175, 180, 185, 190, and 195 are further described below.

Displaying Window to Virtual Environment

In some embodiments, image data is presented by the client device 110 to provide a combined or interchangeable AR/VR experience for the user (e.g., a player of a game). A combined AR/VR experience includes displaying AR image data to the user, while in certain situations, VR image data is displayed to the user. For instance, while displaying images of an external environment (also referred to as the real world), the gaming module 135 displays a window. In the context of this description, a window is a virtual object that allows a user to view a virtual environment that was not previously displayed (referred to as a window). A window is typically displayed over an object in the external environment. For example, a window is displayed over a picture frame on a wall. Thus, a user can move to the picture frame to view portions of a virtual environment that appear to be behind the picture frame. This combined AR/VR experience is further described below with respect to the object identifier module 175 and the window module 180.

The object identifier module 175 receives and analyzes images captured by the camera assembly 125 to identify objects in the images. The object identifier module 175 may identify inanimate objects and animate objects (e.g., animals and humans) or even parts of animate objects (e.g., a hand or a leg). Identifying an object may refer to recognizing that a group of pixels in an image represent an object and determining an object type of the object. An object type describes what the object is (e.g., human, dog, chair, wall, desk, or lamp). For example, the object identifier module 175 determines a group of pixels represent a chair. The object identifier module 175 may be configured to identify common objects in a room, such as walls, tables, chairs, pictures, and lights. In some embodiments, the object identifier module 175 uses a machine learned classifier that can identify one or more types of object in input images (or time series of images). The classifier may be trained using training images that include object type labels for groups of pixels (e.g., that have been manually labelled). Alternatively, rules-based approach may be used in which rules are applied to input images to determine whether a given type of object is depicted.

The object identifier module 175 may also determine whether an identified object satisfies one or more virtual environment criteria. Virtual environment criteria describe objects or characteristics of objects that are suitable to represent a window to a virtual environment. Suitable objects generally have a flat surface that faces the external environment, where a surface area of the surface is large enough to overlay portions of the virtual environment (e.g., a surface area larger than four square inches). Suitable objects may also be mounted to a wall. For example, it is desirable for the object to be thin, rectangular, and mounted to a wall. Suitable objects may also be easily accessible by a user (e.g., the object is visible and there are no obstacles preventing the user from approaching the object). Thus, the object identifier module 175 may determine whether an object satisfies one or more of these virtual environment criteria.

A virtual environment criterion may be a list of object types that are suitable to represent a window. For example, a virtual environment criterion specifies that power outlets, light switches, picture frames, and computer monitors are suitable objects. Thus, in these embodiments, an object may satisfy a virtual environment criterion if it is assigned an object type (by the object identifier module 175) in the list.

In some embodiments, instead of identifying entire objects, the object identifier module 175 identifies surfaces of objects in the external environment and determines whether any of the identified surfaces are suitable to represent a window (e.g., whether the surface is flat and has a surface area above a threshold).

The window module 180 displays (e.g., provides instructions for the client device 110 to display) the window to a virtual environment at an object that satisfies the one or more virtual environment criteria. If more than one identified object satisfies the virtual environment criteria, the window module 180 may select the object that most satisfies the criteria. Alternatively, the window module 180 may allow the user to select one of the objects to represent the window. In some embodiments, the window may not be displayed until an instruction is received from the user to view the window or the client device 110 is within a threshold distance of the identified object.

The window is displayed at (or approximately at) a location of the selected object (e.g., at an outward facing surface of the object) or near a location of the selected object (e.g., within 12 inches of the object). A plane of the window may be substantially parallel to an outward facing surface of the object (e.g., within 5 degrees). A shape and size of the window may correspond to (e.g., match or be substantially similar to) a shape and size of the object. For example, the border of the window matches an outline of the object.

The window allows the user (using the client device 110) to view portions of a virtual environment through the window. In other words, portions of the virtual environment are viewed from the perspective of someone looking through the window. For example, to view other portions of the virtual environment, the user must move the client device 110 relative to the object. In some cases, the window includes a door that a user must open (e.g., by selecting the door) to view portions of the virtual environment.

The virtual environment typically includes objects of interest to the user playing a game (e.g., the parallel reality game). For example, the virtual environment includes virtual characters that relate to a game. In some cases, virtual characters in the virtual environment interact with virtual or real objects in the external environment (e.g., virtual characters in the external environment). For example, a virtual character in the virtual environment talks to the user through the window. Information regarding the virtual environment, such as its size and shape and objects in the virtual environment may be received from the game server 120. For example, the game server 120 provides instructions to display a virtual room that includes four walls, a floor, and a ceiling and to display specific virtual objects in the room.

In some embodiments, the user can 'enter' the virtual environment, for example, by selecting the window or providing an instruction to enter the window. In these embodiments, image data of the virtual environment may be displayed instead of image data of the external environment to indicate that the user has 'entered' the virtual environment (in other words, the client device displays VR images corresponding to the virtual environment).

In some embodiments, the window module 180 displays an AR visual effect (e.g., animation effect) on or around the selected object prior to displaying the window at the object. The visual effect is intended to attract the user's gaze to the object and to inform the user that a window will be displayed at the object. The visual effect may move and change color to attract the user's attention. For example, the visual effect changes the color of the object. Other examples of visual effects include smoke, explosions, fireworks, and stars.

Figure 4A:
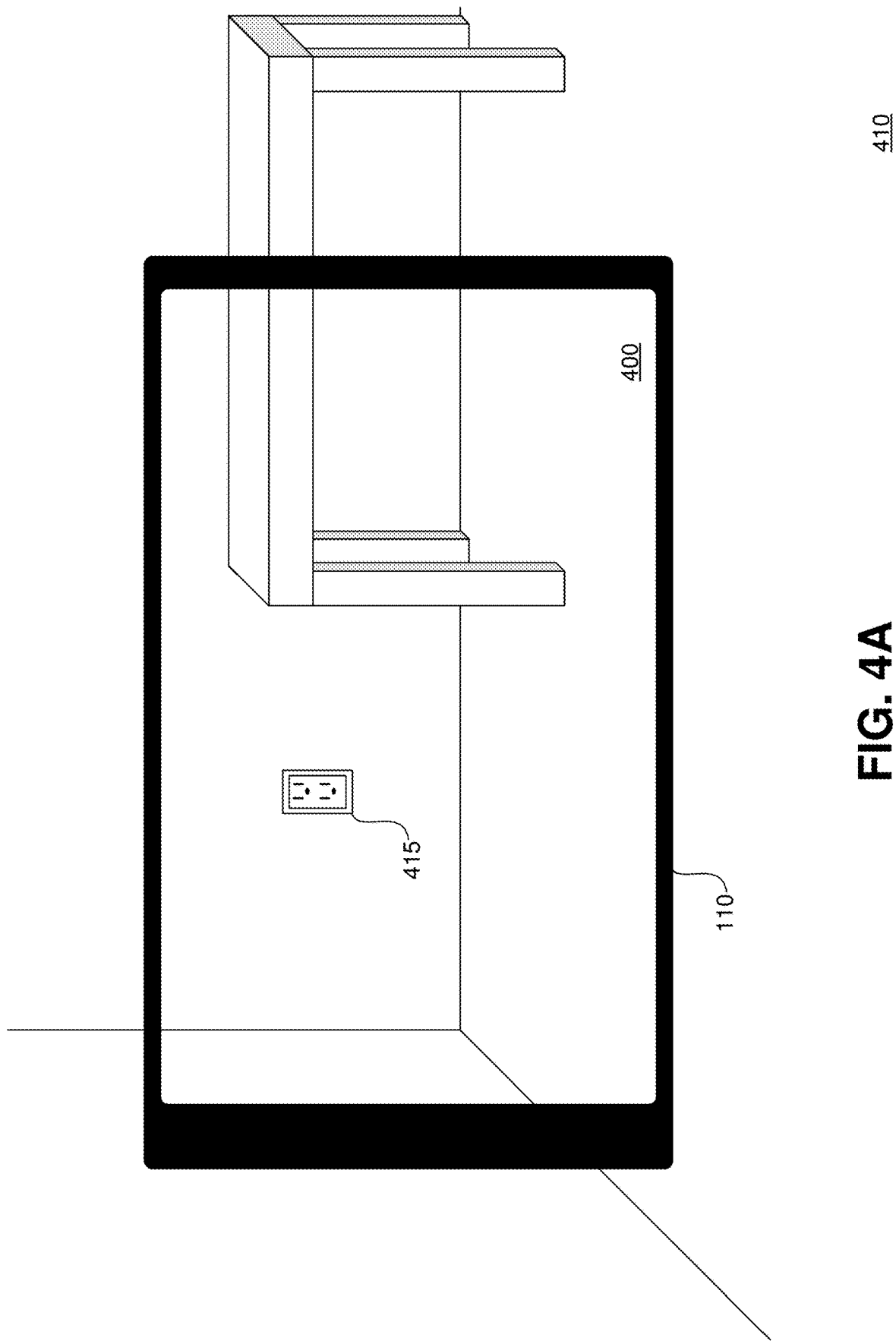
Figure 4B:
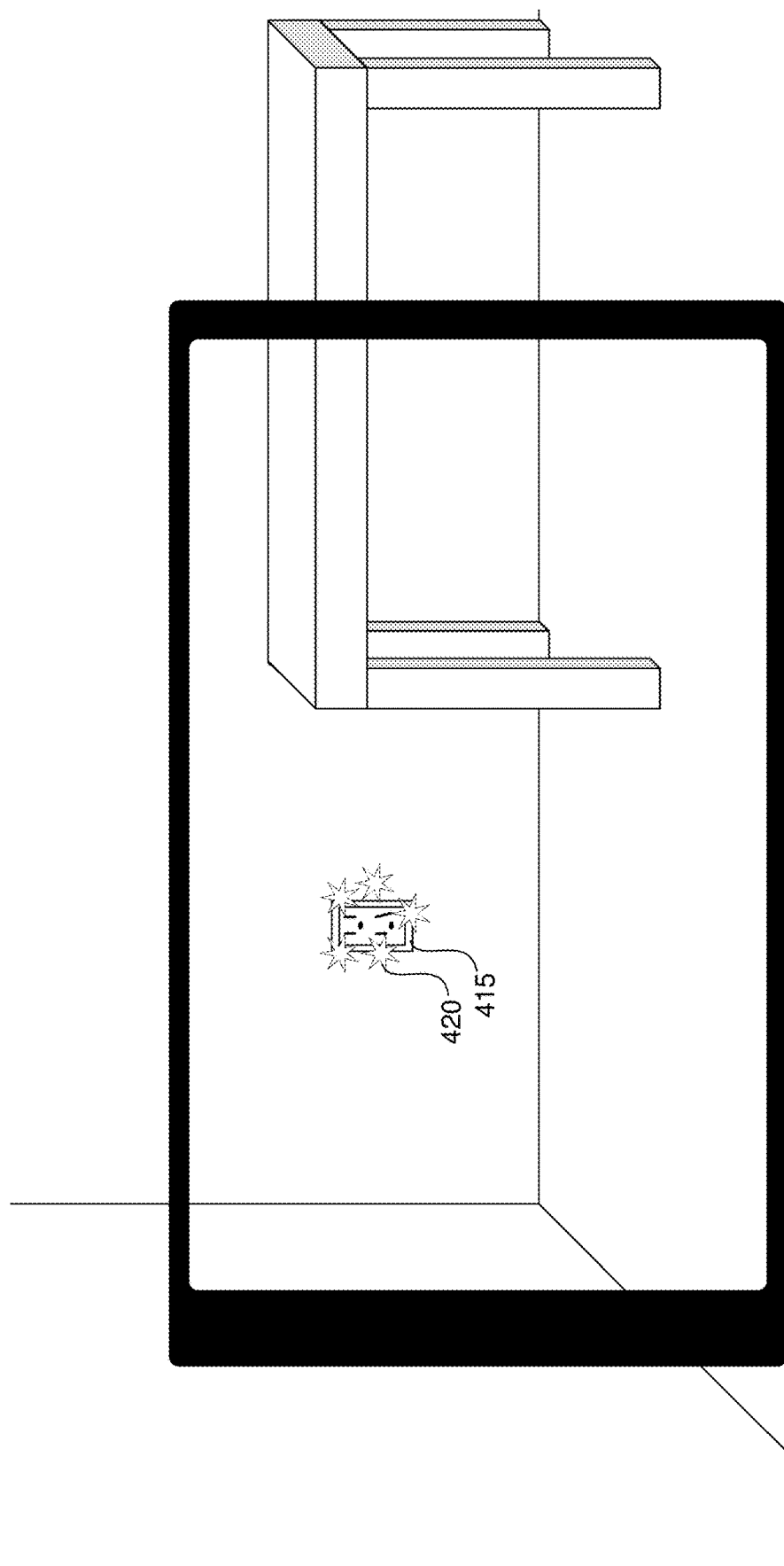

FIGS. 4A-4D are a sequence of example images that illustrate the display of a window to a virtual environment, according to some embodiments. FIG. 4A depicts a display 400 of a client device 405 displaying image data of an external environment 410, according to an embodiment. In the example of FIG. 4A, the external environment 410 is a portion of a room that includes two walls, a floor, a table, and a power outlet 415 mounted to a wall. While not illustrated in FIG. 4A, the image data of the external environment 410 may be augmented with virtual objects.

In the example of FIGS. 4A-4D, the wall outlet 415 is selected to represent a window to a virtual environment. To communicate this to the user, the window module 180 displays a visual effect 420 over the wall outlet 420 (see FIG. 4B). In this example, the visual effect 420 includes stars around the outlet 415.

Figure 4C:
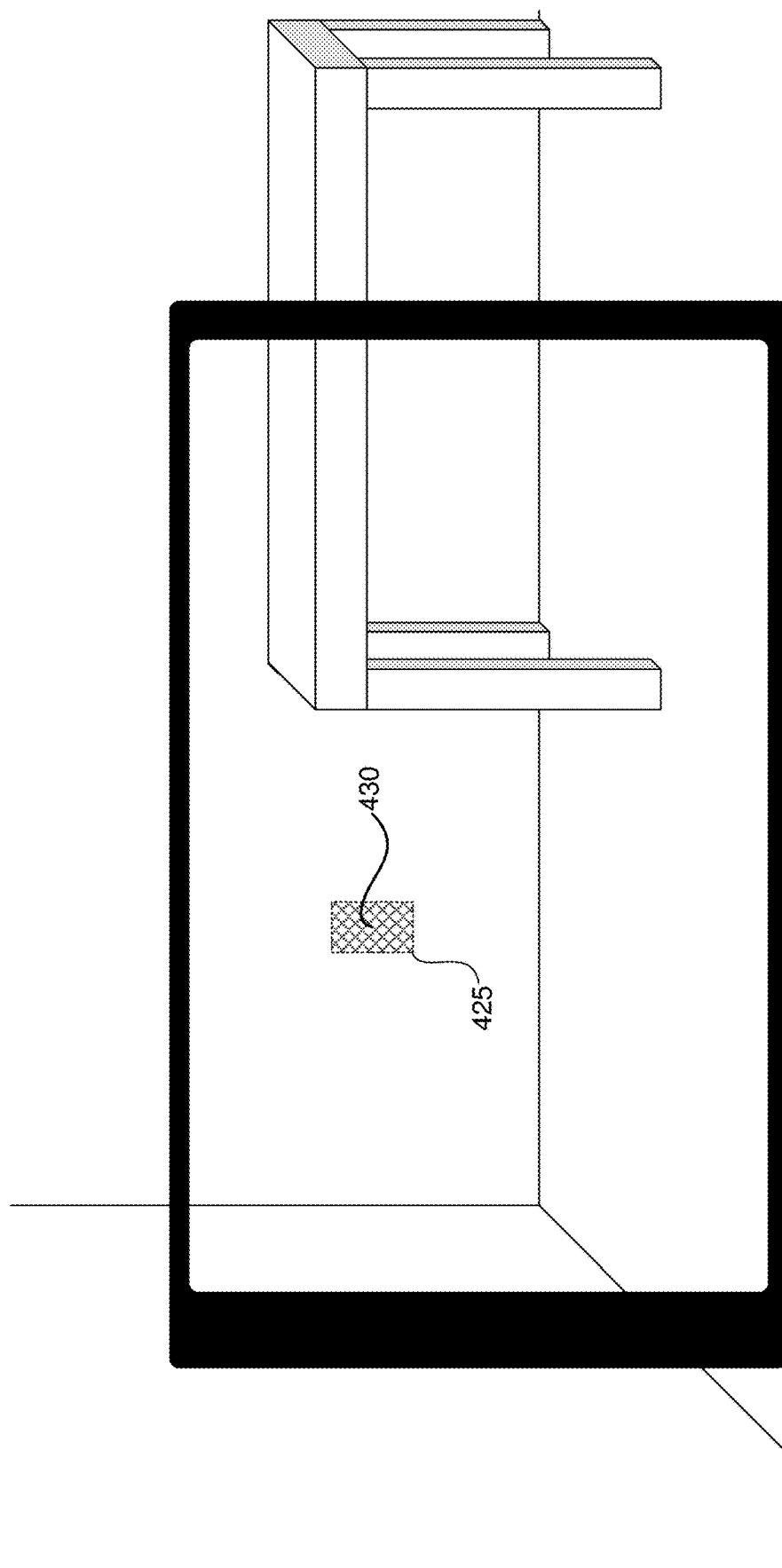

FIGS. 4C and 4D illustrate a window 425 to a virtual environment 430 displayed over the outlet 415. A size and shape of the window 425 matches the size and shape of the outlet 415. In FIG. 4D, the client device 110 is closer to the outlet 415 so that details of the virtual environment 430 may be seen. The virtual environment 430 includes two virtual characters 430 and a virtual table 440 in a room. The room appears to be behind the wall that the outlet 415 is mounted to.

Light Interaction

As described with respect to FIG. 1, the client device 110 may include a light assembly 143 which can generate light that illuminates the external environment. For example, the light assembly generates enough light to assist a user view portions of an external environment in a low light situation. The light assembly 143 may also be used by the camera assembly 125 to illuminate the external environment when capturing an image. To generate light, the light assembly includes one or more light sources, such as a light emitting diode (LED). The remaining description assumes the light source of the light assembly 143 is positioned so that the images captured by the camera assembly 125 include a region of the external environment that is illuminated by the light assembly 143. For example, the light assembly 143 faces a same direction as the camera assembly 125.

When the light assembly 143 is generating light, it may be referred to as being "on." When the light assembly 143 is generating no light or low amounts of light, it may be referred to as being "off." The light assembly 143 may provide a user interface that allows a user to turn the light assembly 143 off and on. The gaming module 135 may also include a user interface that allows the user to control the light assembly 143 (e.g., so that the user can control the light assembly 143 without leaving the game).

In some gaming situations or gaming modes, the user may use light from the light assembly 143 to interact with virtual objects that are displayed in the external environment (or a virtual environment). For example, when the light assembly 143 is on, the gaming module 143 reveals virtual objects that were not previously displayed. In another example, after the light assembly 143 is turned on, virtual characters in the external environment gather towards a region of the external environment that is illuminated by the light assembly 143. Depending on the game, if the light assembly 143 is turned off, the virtual objects may remain in the region or they may begin to move through the external environment again. Thus, by turning on the light assembly 143, a user may control locations of the virtual objects in the external environment by moving the client device 110 (and thus changing the portion of the environment that is illuminated by the light assembly 143). In this example, an instruction to turn on the light assembly 143 may be referred to as a gather instruction. In some embodiments, a user can instruct a virtual object to move to a location in the external environment by selecting a region of the display (e.g., that is displaying the location).

The flashlight module 185 is communicatively coupled to the light assembly 143 and displays (e.g., provides instructions for the client device 110 to display) movement of virtual objects. Specifically, responsive to the light assembly 143 being turned on, the flashlight module 185 displays virtual objects moving from their current locations in the external environment towards a region of the external environment that is illuminated by the light assembly 143.

Since the light assembly 143 is typically fixed relative to the camera assembly, the flashlight module 185 does not need to identify light from the light assembly 143 in the image data of the external environment. Instead, the flashlight module 185 may move the virtual objects to a region of the external environment that is being displayed by the client device 110 (referred to as a region of the external environment that corresponds with a region of the display). In some cases, virtual objects are moved to a specific region of the display, such as a central region. If the client device 110 is moved while the light assembly 143 is on, a different region of the environment will be illuminated. If the movement is above a threshold (e.g., determined by analyzing a signal from the positioning module 140), the flashlight module 185 may display the virtual objects moving from their previous locations to the new region that is receiving light.

In some embodiments, the flashlight module 185 displays a visual effect (e.g., an animation effect) to indicate the region that is illuminated by the light assembly 143. This may help the user identify the region. Example visual effects include a virtual spotlight or highlighting of the region.

Figure 5A:
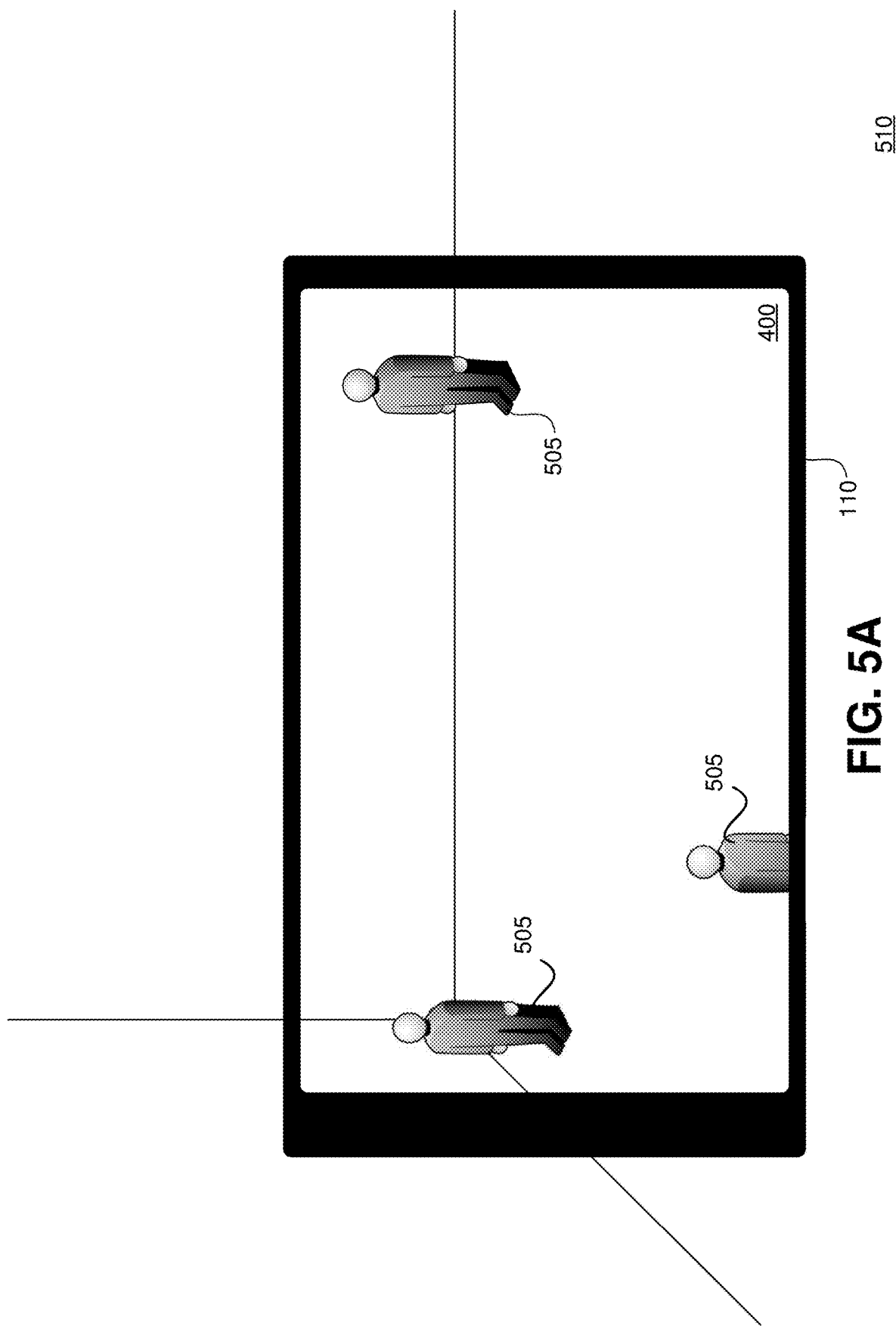
FIGS. 5A and 5B are a sequence of images that illustrate the gathering of virtual objects, according to some embodiments.
Figure 5B:
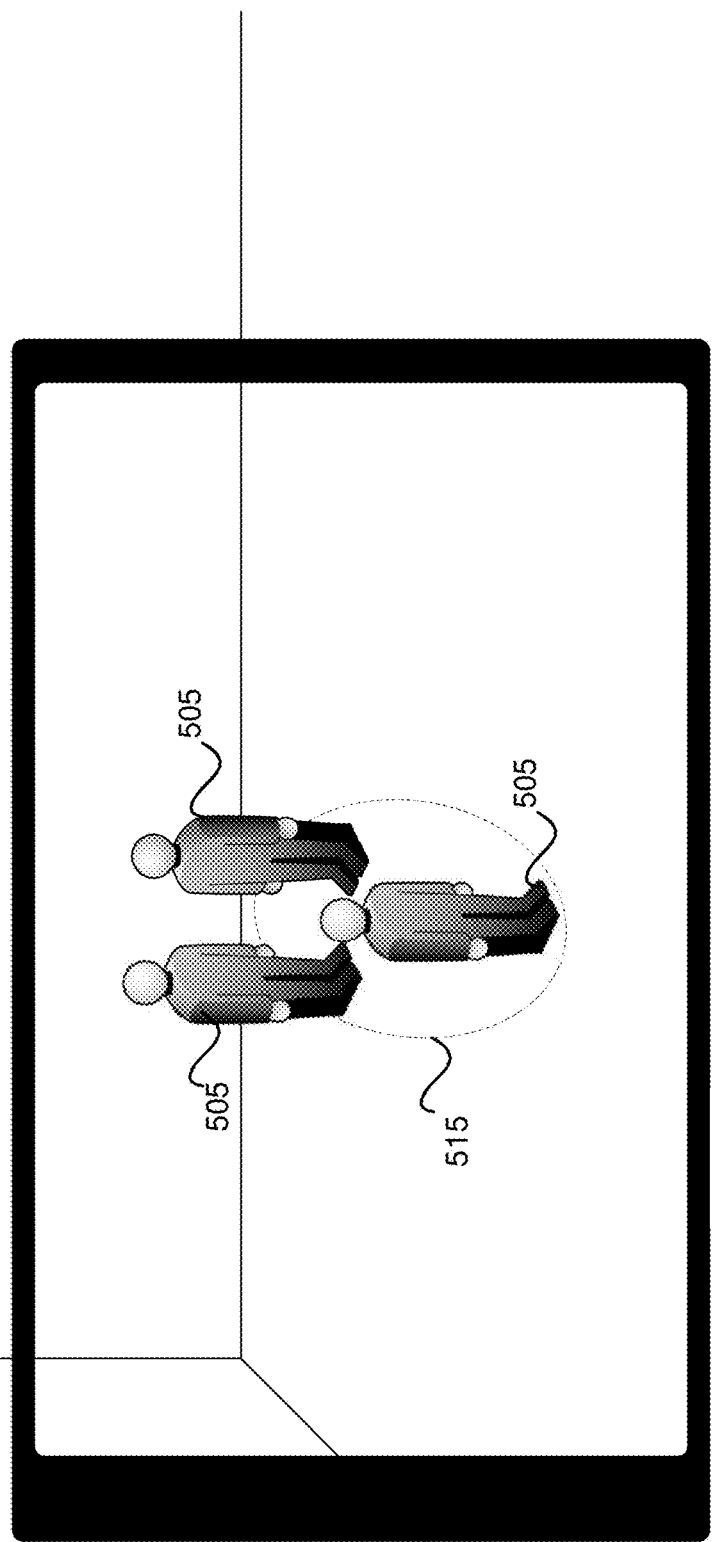

FIGS. 5A and 5B are a sequence of example images that illustrate the gathering of virtual objects, according to some embodiments. FIG. 5A depicts a client device 110 displaying image data of three virtual characters 505 in an external environment 510, according to an embodiment. The virtual characters 505 have human shapes and are located throughout the external environment 510. The virtual characters 505 may be located throughout the external environment 510 for any number of reasons. For example, the game module 135 generated the virtual characters 505 in random locations in the external environment 510 or the game module 135 displays the virtual characters 505 walking around the external environment.

While playing the game, it may be desirable for the user to gather the three virtual characters 505 to a region of the external environment 510. To gather the virtual characters

505, the user may turn on the light assembly 143 as described above. FIG. 5B depicts a client device 110 displaying image data that includes the three virtual characters 505 gathered at a region of the external environment 515 that is illuminated by the light assembly 143, according to an embodiment. In the example of FIG. 5B, the outline of the illuminated region 515 is virtually highlighted by a visual effect to help the user identify the region 515.

Virtual Object Interaction

Referring back to FIG. 1, the object interaction module 190 displays (e.g., provides instructions for the client device 110 to display) virtual objects interacting with objects in the external environment. This may result in the virtual objects appearing more realistic and lifelike to the user. To do this, the object interaction module 190 receives identified objects from the object interaction module 190. By analyzing characteristics of the identified objects, such as their shapes and surfaces, the object interaction module 190 may display virtual objects directly or indirectly interacting with the identified objects. Examples of indirect interactions include a virtual character walking around or looking at an object. Examples of direct interactions include a virtual character touching, leaning on, standing on, or climbing on an object. For example, the object interaction module 190 displays a virtual character climbing on (e.g., up or down) an object, such as a stick-type object or an object with ledges or handles. In another example, the object interaction module 190 displays a virtual character sliding down a sloped surface that is angled by more than a threshold amount (e.g., less than eighty degrees and more than five degrees) relative to what the object interaction module 190 has determined to be the ground plane (e.g., the plane that is perpendicular to the force of gravity or the average orientation of the visible ground in the camera's field of view, etc.).

In some embodiments, the object interaction module 190 displays virtual objects interacting with the user. For example, a user can 'pick up' a virtual object and move it to a different location in the environment. In another example, the object interaction module 190 provides instructions so that a virtual object 'follows' a user in the external environment. In this example, the object interaction module 190 may identify an object as a human. The object interaction module 190 may then display a virtual character moving (e.g., walking) behind the human in the environment. Components of the human's body may be identified (e.g., leg, torso, and arms) so that the virtual character can be displayed as walking in lockstep behind the human.

The depth estimator module 195 estimates a distance of an object (identified by the object identifier module 175) from the client device 110. Based on the estimated distance (also referred to as depth information), the gaming module 135 displays (e.g., provides instructions for the client device 110 to display) a virtual object in the external environment. For example, if a virtual object will be displayed near an object, the size of the virtual object may be adjusted based on the estimated distance of the object. In some embodiments, the depth information enables a virtual object to be displayed partly behind by an object. For example, if depth information indicates that a real-world object is closer than a location of a virtual object to be displayed, the virtual object may be displayed such that the real-world object appears to obscure a portion of the virtual object. Thus, using depth information may make the virtual objects appear more realistic.

In some embodiments, the gaming module 135 includes a virtual camera module (not illustrated) that allows a user to take photographs that show virtual objects in the external environment. In these embodiments, the virtual objects may also be displayed based on depth information.

The depth estimator module 195 may be machine learned. For example, it is trained using training images that include object distance labels for groups of pixels in the image (e.g., that have been manually labelled). If the client device includes two cameras, a distance may be estimated based on stereo image data. Alternatively, rules-based approach may be used in which rules are applied to input images to estimate a distance of objects in the input images.

Figure 6:
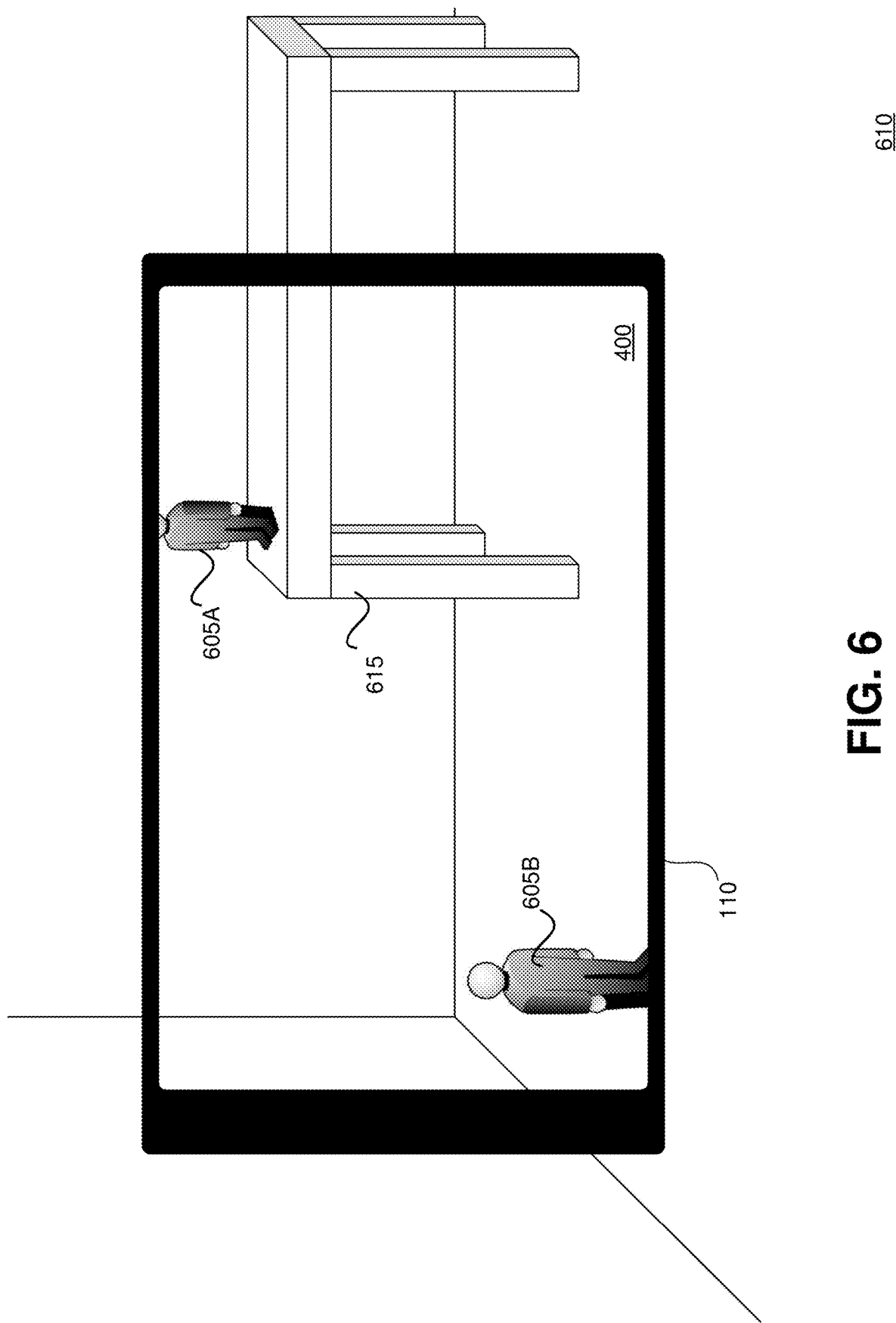
FIG. 6 depicts a client device 110 displaying image data of two virtual characters 605 in an external environment, according to an embodiment.

FIG. 6 depicts a client device 110 displaying image data of two virtual characters 605 in an external environment 610, according to an embodiment. Character 605A is displayed as standing on a table in the background of the image while character 605B is displayed as standing on the ground in the foreground of the image. Although the virtual characters 605 have a same size, the characters 605 are displayed with different sizes in the image so that the characters appear to be in the external environment 610. In particular, since character 605A is displayed in the background and character 605B is displayed in the foreground, character 605A is smaller than character 605B to provide a sense of depth. The sizes of the characters 605 may be based on distance information from the depth estimation module 195. For example, the depth estimation module 195 estimates a distance between the client device and the table and determines a height of the characters 605A and 605B based on the distance.

Module Interaction

While the window module 180, flashlight module 185, object interaction module 190, and depth estimation module 195 were described above in isolation, they may be used together to create an improved gaming experience for the user. For example, each virtual object may be displayed based on depth information from the depth estimation module 195.

In another example, in some gaming situations, the virtual environment may be dark such that a user cannot view portions of the virtual environment through the window. To view the virtual environment, the user may virtually illuminate portions of the virtual environment by turning on the light assembly 143 and positioning the client device 110 so that light appears to propagate through the window into the virtual environment. Similarly, the user may direct virtual objects in the external environment to move through the window and into the virtual environment by positioning the client device 110 so that light from the light assembly appears to propagate through the window into the virtual environment.

In another example, if the user directs light onto their hand by turning on the light assembly 143 and placing their hand in front of the client device 110, a virtual object may move onto the user's hand. Afterwards the user may move the virtual object in the external environment by moving their hand. Furthermore, if a window is displayed and the user moves their hand close to the object representing the window, the gaming module 135 may display the virtual object being placed in the virtual environment through the window.

Process for Displaying Window to Virtual Environment

Figure 7:
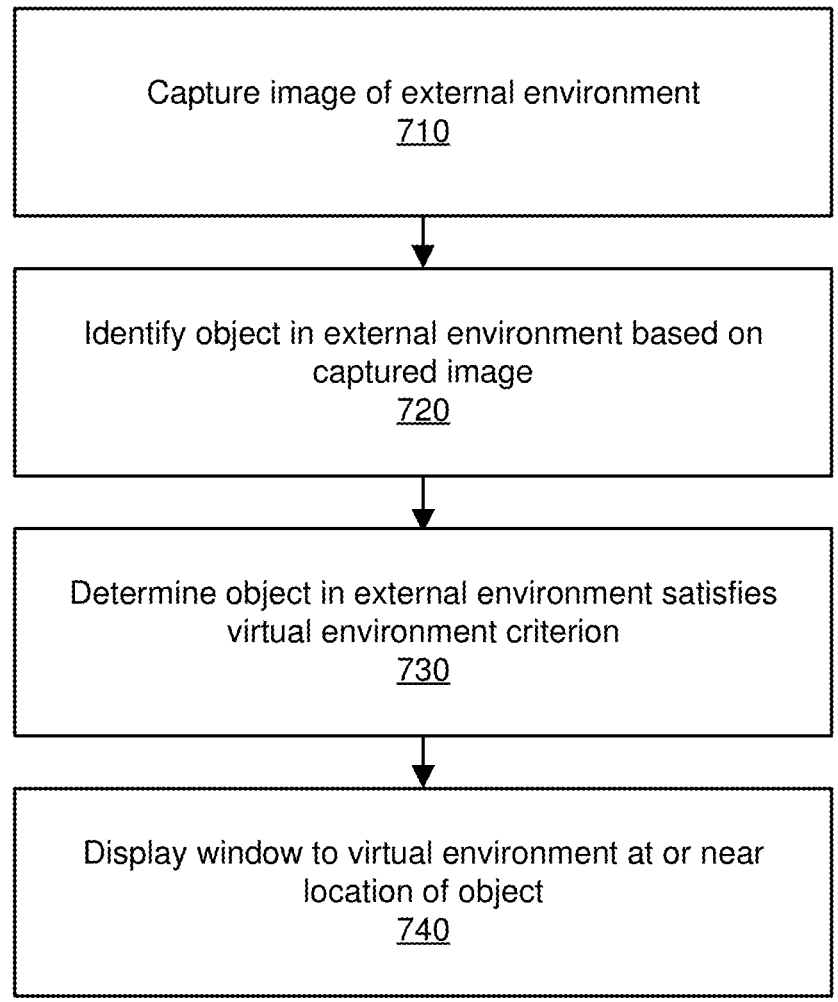
FIG. 7 is a flowchart describing a general process of displaying a window to a virtual environment, according to an embodiment.

FIG. 7 is a flowchart describing a general process 700 of displaying a window to a virtual environment, according to an embodiment. The process 700 may be accomplished by a client device (e.g., client device 110) having an object identifier module and a window module. The client device may be a mobile device such as a smartphone and have a camera (e.g., camera assembly 125), a light assembly (e.g., light assembly 143) and a display. In some embodiments, the client device at least in part implements the parallel reality game described in FIGS. 1-3 above. Although the following description is within the context of a client device, the process 700 (or steps of the process) may be performed on other computing devices (e.g., a server). The steps of process 700 may be performed in different orders, and the process 700 may include different, additional, or fewer steps.

The client device captures 710 an image of an external environment by a camera assembly. The client device identifies 720 an object in the external environment based on the captured image. The client device determines 730 the object in the external environment satisfies a virtual environment criterion. The client device displays 740 a window to a virtual environment at or near a location of the object in additional images of the external environment captured by the camera assembly. The client device may display the window responsive to determining that the object satisfies the criterion.

In some embodiments, the client displays a virtual object in the external environment moving to the virtual environment through the window.

The client device may receive, from a server, information regarding the virtual environment, and it may determine, using the information regarding the virtual environment, virtual content to display through the window.

In some embodiments, the process 700 further includes the client device identifying candidate objects in the external environment. The client device determines whether each of the candidate objects satisfy the virtual environment criterion. The client device selects, as the object, one of the candidate objects that satisfies the virtual environment criterion.

The process 700 may further include the client device receiving an instruction to display the virtual environment, and responsive to receiving the instruction, displaying the virtual environment instead of images of the external environment.

The process 700 may further include the client device identifying a second object with a sloped surface in the external environment based on the captured image, and displaying a virtual object climbing up the second object and sliding down the sloped surface of the second object in the additional images of the external environment captured by the camera assembly.

In some embodiments, determining the object in the external environment satisfies the virtual environment criterion comprises determining the object is on a wall in the external environment.

Process for Moving Virtual Objects

Figure 8:
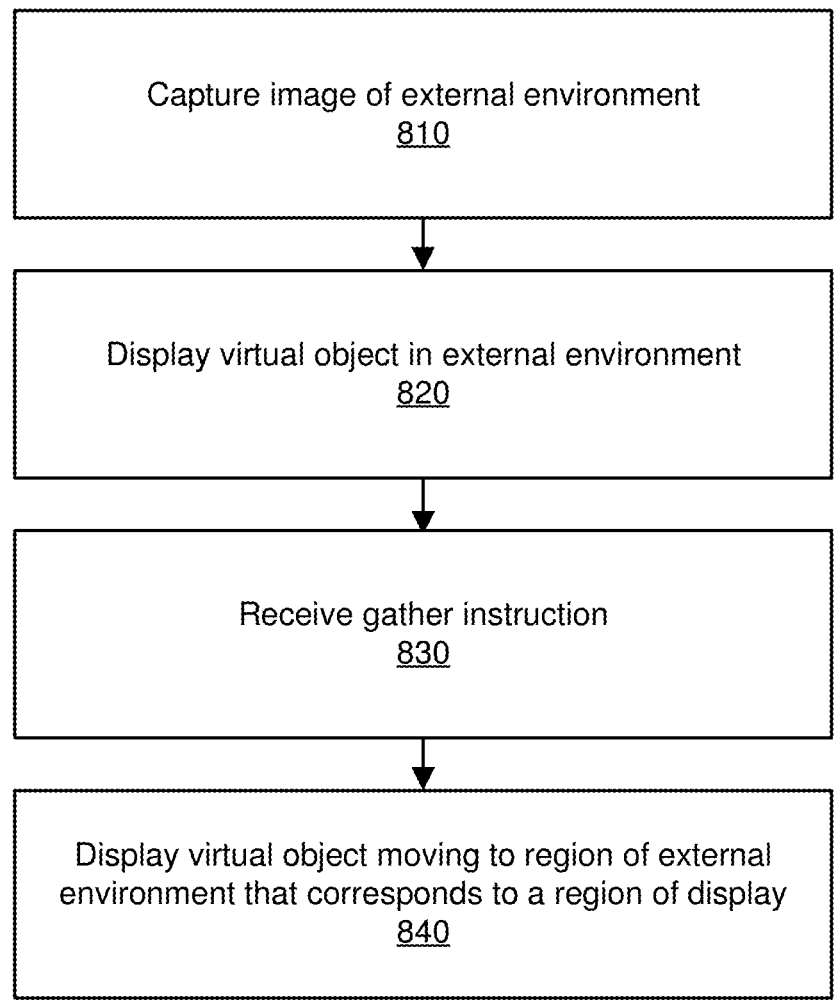
FIG. 8 is a flowchart describing a general process of moving a virtual object in an external environment, according to an embodiment.

FIG. 8 is a flowchart describing a general process 800 of moving a virtual object in an external environment, according to an embodiment. The process 800 may be accomplished by a client device (e.g., client device 110) having a flashlight module. The client device may be a mobile device such as a smartphone and have a camera (e.g., camera assembly 125), a light assembly (e.g., light assembly 143) and a display. In some embodiments, the client device at least in part implements the parallel reality game described in FIGS. 1-3 above. Although the following description is within the context of a client device, the process 800 (or steps of the process) may be performed on other computing devices (e.g., a server). The steps of process 800 may be performed in different orders, and the process 800 may include different, additional, or fewer steps.

The client device captures 810 an image of an external environment by a camera assembly. The client device displays 820 a virtual object in the image of the external environment on a display. The client device receives 830 a gather instruction (e.g., from a user). The client device displays 840 the virtual object in additional images of the external environment captured by the camera assembly moving to a region of the external environment that corresponds to a region of the display. The client device may display the virtual object moving responsive to receiving the gather instruction.

In some embodiments, the gather instruction is an instruction to turn on the light assembly of the client device. The region of the external environment may be a region that is illuminated by light from the light assembly. In some embodiments, the client device displays a visual effect at the region of the display to indicate the region of the external environment that is illuminated by light from the light assembly.

In some embodiments, the client displays a plurality of virtual objects in the image of the external environment, each object being displayed at a different location in the external environment. The client device may display each of the plurality of virtual objects moving from their locations to the region of the external environment.

In some embodiments, the client device determines movement of the client device is above a threshold. Responsive to determining movement of the client device is above the threshold, the client device displays the virtual object moving from the region of the external environment to a second region of the external environment that corresponds to the region of the display.

The process 800 may further include the client device identifying an object with a sloped surface in the external environment based on the captured image, and displaying the virtual object climbing up the object and sliding down the sloped surface of the object.

Although the process 800 is described in an AR context, a similar process may be performed in a VR context. For example, the client device displays images of a VR environment, and responsive to receiving a gather instruction, the client device displays a virtual object in the VR environment moving to a region of the VR environment that corresponds to a region of the display.

Process for Displaying a Virtual Object

Figure 9:
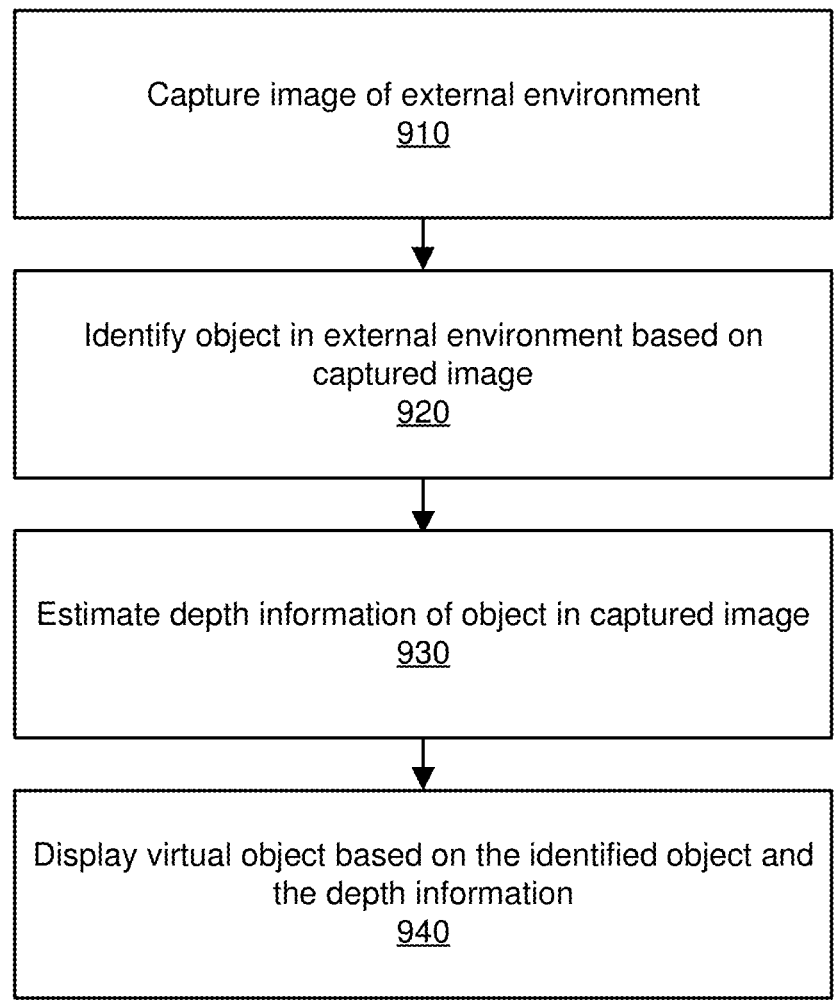
FIG. 9 is a flowchart describing a general process of displaying a virtual object in an external environment, according to an embodiment.

FIG. 9 is a flowchart describing a general process 900 of displaying a virtual object in an external environment, according to an embodiment. The process 900 may be accomplished by a client device (e.g., client device 110) having a flashlight module. The client device may be a mobile device such as a smartphone and have a camera (e.g., camera assembly 125), a light assembly (e.g., light assembly 143) and a display. In some embodiments, the client device at least in part implements the parallel reality game described in FIGS. 1-3 above. Although the following description is within the context of a client device, the process 900 (or steps of the process) may be performed on other computing devices (e.g., a server). The steps of process 900 may be performed in different orders, and the process 900 may include different, additional, or fewer steps.

The client device captures 910 an image of an external environment by a camera assembly. The client device identifies 920 an object in the external environment based on the captured image. The client device estimates 930 depth information of the object in the captured image. The client device displays 940 a virtual object based on the identified object and the depth information.

In some embodiments, the virtual object is a virtual character and displaying the virtual object comprises displaying the virtual character interacting with the object.

In some embodiments, the object is a human hand.

The process 900 may further include identifying a sloped surface of the object in the external environment based on the captured image, and displaying the virtual object climbing up the object and sliding down the sloped surface of the object.

Example Computing System

Figure 10:
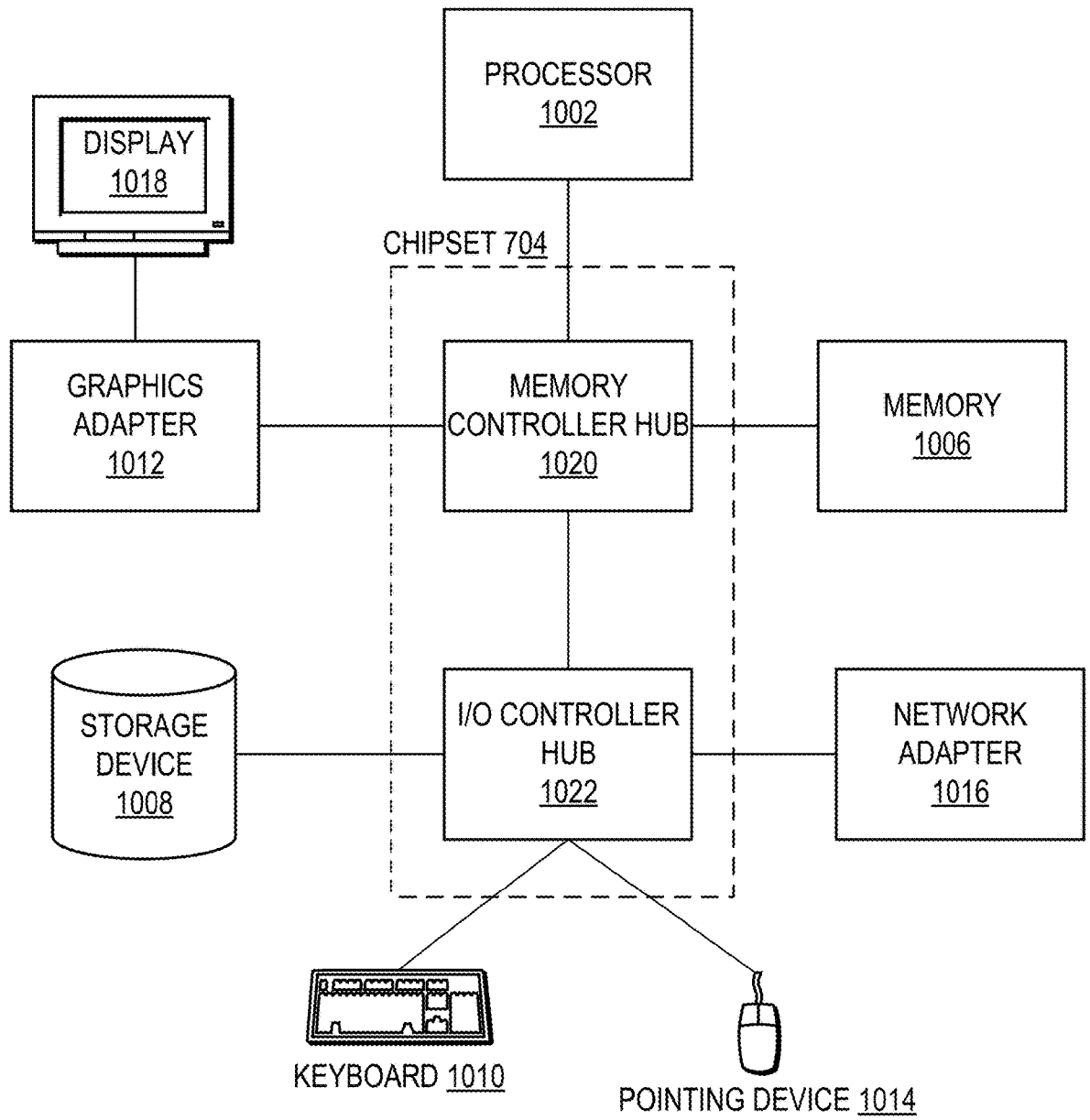
FIG. 10 illustrates an example computer system suitable for use in training or applying a traversable space model, according to one or more embodiments.

FIG. 10 is an example architecture of a computing device, according to an embodiment. Although FIG. 10 depicts a high-level block diagram illustrating physical components of a computer used as part or all of one or more entities described herein, in accordance with an embodiment, a computer may have additional, less, or variations of the components provided in FIG. 10. Although FIG. 10 depicts a computer 1000, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 10 are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O hub 1022. In another embodiment, the memory 1006 is coupled directly to the processor 1002 instead of the chipset 1004. In some embodiments, the computer 1000 includes one or more communication buses for interconnecting these components. The one or more communication buses optionally include circuitry (sometimes called a chipset) that interconnects and controls communications between system components.

The storage device 1008 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1008 can also be referred to as persistent memory. The pointing device 1014 may be a mouse, track ball, or other type of pointing device, and is used in combination with the keyboard 1010 to input data into the computer 1000. The graphics adapter 1012 displays images and other information on the display 1018. The network adapter 1016 couples the computer 1000 to a local or wide area network.

The memory 1006 holds instructions and data used by the processor 1002. The memory 1006 can be non-persistent memory, examples of which include high-speed random access memory, such as DRAM, SRAM, DDR RAM, ROM, EEPROM, flash memory.

As is known in the art, a computer 1000 can have different or other components than those shown in FIG. 10. In addition, the computer 1000 can lack certain illustrated components. In one embodiment, a computer 1000 acting as a server may lack a keyboard 1010, pointing device 1014, graphics adapter 1012, or display 1018. Moreover, the storage device 1008 can be local or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 1008, loaded into the memory 1006, and executed by the processor 302.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for providing the disclosed AR functionality. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A non-transitory computer-readable storage medium comprising stored instructions that, when executed by a computing device, cause the computing device to perform operations including:
   capturing an image of an external environment by a camera assembly;
   identifying an object in the external environment based on the captured image;
   determining the object in the external environment satisfies a virtual environment criterion; and
   responsive to determining the object satisfies the virtual environment criterion, displaying a window, to a virtual environment, at or near a location of the object in additional images of the external environment captured by the camera assembly, wherein at least a portion of the virtual environment is rendered in the additional images as being viewed from the external environment through the window.

2. The non-transitory computer-readable storage medium of claim 1, wherein the operations further include displaying a virtual object in the external environment moving to the virtual environment through the window.

3. The non-transitory computer-readable storage medium of claim 1, wherein the operations further include:
   receiving, from a server, information regarding the virtual environment; and
   determining, using the information regarding the virtual environment, virtual content to display through the window.

4. The non-transitory computer-readable storage medium of claim 1, wherein the operations further include:
   identifying candidate objects in the external environment;
   determining whether each of the candidate objects satisfy the virtual environment criterion; and
   selecting, as the object, one of the candidate objects that satisfies the virtual environment criterion.

5. The non-transitory computer-readable storage medium of claim 1, wherein the operations further include:
   receiving an instruction to display the virtual environment; and
   responsive to receiving the instruction, displaying the virtual environment instead of images of the external environment.

6. The non-transitory computer-readable storage medium of claim 1, wherein a shape and size of the window corresponds to a shape and size of the object.

7. The non-transitory computer-readable storage medium of claim 1, wherein a plane of the window is substantially parallel to a surface of the object.

8. The non-transitory computer-readable storage medium of claim 1, wherein the virtual environment is a virtual room with one or more virtual objects.

9. The non-transitory computer-readable storage medium of claim 1, wherein determining the object in the external environment satisfies the virtual environment criterion comprises determining the object is on a wall in the external environment.

10. The non-transitory computer-readable storage medium of claim 1, wherein the operations further include:
    displaying a virtual object in the external environment on a display;
    receiving a gather instruction via user input, wherein the gather instruction comprises an instruction to turn on a light assembly of a mobile device associated with the display; and
    responsive to receiving the gather instruction, displaying the virtual object moving to a region of the external environment that corresponds to a region of the display.

11. The non-transitory computer-readable storage medium of claim 1, wherein the operations further include:
    identifying a second object with a sloped surface in the external environment based on the captured image; and
    displaying a virtual object climbing up the second object and sliding down the sloped surface of the second object in the additional images of the external environment captured by the camera assembly.

12. The non-transitory computer-readable storage medium of claim 1, wherein the window is displayed overlaying the object in the additional images such that it appears that the object has been replaced by the window.

13. A non-transitory computer-readable storage medium comprising stored instructions that, when executed by a computing device, cause the computing device to perform operations including:
    capturing an image of an external environment by a camera assembly;
    displaying a virtual object in the image of the external environment on a display;
    receiving an instruction, via user input, to turn on flashlight;
    responsive to receiving the instruction to turn on the flashlight, identifying, for each of a plurality of additional images captured by the camera assembly, a region of the display corresponding to a portion of the external environment that would be illuminated by the flashlight; and
    displaying the virtual object, overlaid on the additional images of the external environment, moving towards the region of the display corresponding to the portion of the external environment.

14. The non-transitory computer-readable storage medium of claim 13, wherein the flashlight is a physical flashlight that illuminates the external environment.

15. The non-transitory computer-readable storage medium of claim 13, wherein the operations further include:
    identifying an object with a sloped surface in the external environment based on the captured image; and
    displaying the virtual object climbing up the object and sliding down the sloped surface of the object.

16. The non-transitory computer-readable storage medium of claim 13, wherein:
    displaying the virtual object comprises displaying a plurality of virtual objects in the image of the external environment, each object being displayed at a different location in the external environment, and displaying the virtual object in the additional images moving to the region of the external environment that corresponds to the region of the display comprises displaying each of the plurality of virtual objects moving from their locations to the region of the external environment.

17. The non-transitory computer-readable storage medium of claim 13, wherein the operations further include:
determining movement of a client device associated with the display is above a threshold;
responsive to determining movement of the client device is above the threshold, displaying the virtual object moving from the region of the external environment to a second region of the external environment that corresponds to the region of the display.

18. The non-transitory computer-readable storage medium of claim 13, wherein as the viewpoint of the camera assembly capturing the images moves, the portion of the environment displayed in updated.

19. The non-transitory computer-readable storage medium of claim 13, wherein the flashlight is a virtual spotlight on the region of the display.

* * * * *